United States Patent
Watanabe et al.

[11] Patent Number: 6,109,905
[45] Date of Patent: Aug. 29, 2000

[54] APPARATUS FOR GRANULATING POWDER

[75] Inventors: Osami Watanabe, Itano-gun; Katsushi Kawashima; Koji Nagao, both of Naruto; Masahiro Sasaki, Anan, all of Japan

[73] Assignee: Fujisaki Electric Co., Ltd., Anan, Japan

[21] Appl. No.: 09/262,076

[22] Filed: Mar. 4, 1999

Related U.S. Application Data

[62] Division of application No. 08/960,350, Oct. 29, 1997, Pat. No. 6,013,216.

[30] Foreign Application Priority Data

Nov. 1, 1996 [JP] Japan ................................. 8-307235
Aug. 8, 1997 [JP] Japan ................................. 9-227226

[51] Int. Cl.$^7$ .......................................... B29C 67/02
[52] U.S. Cl. ............................. 425/222; 425/DIG. 20; 264/117; 264/DIG. 51
[58] Field of Search ............................. 55/302; 264/117, 264/121, DIG. 51; 425/222, DIG. 50

[56] References Cited

U.S. PATENT DOCUMENTS

| | | | |
|---|---|---|---|
| 3,632,257 | 1/1972 | Ashizawa | 425/222 |
| 3,880,968 | 4/1975 | Kaspar et al. | 264/117 |
| 4,264,552 | 4/1981 | McMahon et al. | 264/117 |
| 4,724,794 | 2/1988 | Itoh | 425/222 |
| 4,772,193 | 9/1988 | Glatt | 425/222 |
| 4,832,700 | 5/1989 | Kaspar et al. | 264/117 |

*Primary Examiner*—Robert Davis
*Assistant Examiner*—Thukhanh T. Nguyen
*Attorney, Agent, or Firm*—Wenderoth, Lind & Ponack, L.L.P.

[57] ABSTRACT

An apparatus for granulation of fine, light powder by mixing a powder and a mist of binder with a fluidizing air flow. The apparatus includes a container and a filter, provided along an inner peripheral surface of the container, for forming a high density powder layer thereon. A space, formed between the container and the filter, is divided into a plurality of ring-shaped zones. Also, a backwash mechanism and an exhaust mechanism are connected to the container so as to be selectively communicated with the ring-shaped zones.

11 Claims, 11 Drawing Sheets

APPARATUS FOR GRANULATING POWDER

This is a divisional application of Ser. No. 08/960,350, filed Oct. 29, 1997, now U.S. Pat. No. 6,013,216.

BACKGROUND OF THE INVENTION

The present invention relates to a method of granulating powder and an apparatus for granulating powder and, more specifically, to a method of granulating powder applied in the manufacture of granulated or powdery products such as pharmaceuticals, food, agricultural chemicals, ceramics, etc. (hereinafter referred to as "granule" or "granulated product" in some cases) and an apparatus for granulating powder.

Fine powder the particle diameter of which is several $\mu m$ or under is generally light and easily dispersed although there is also heavy powder such as metallic powder, and the fine particles which fly up have strong adhesion to the inner face a of container, etc. of a fluidized bed granulating apparatus.

Moreover, such light fine powder is poor in fluidity and cannot form the necessary fluidized bed for performing fluidized bed granulation, for example. This is because all of the powder cannot be moved if the fluidizing air capacity for fluidized bed granulation is small but, as the air capacity is gradually increased, the powder suddenly flies up like smoke, and it is impossible to find any proper air capacity for fluidization.

Also, the flied-up light fine powder can adhere to the inner face of the container, etc. of the fluidized bed granulating apparatus and gradually accumulates there. This deposition is not easily removed. So the light fine powder cannot be mixed, much less granulated in fluidized bed granulating apparatuses.

Furthermore, such light fine powder, which has a strong flocculating performance in addition to the abovementioned nature, often forms a flocculated lump consisting of hundreds to thousands of primary particles, and it is impossible to coat all of the primary particles with a binder because the flocculated lump cannot be dispersed into individual primary particles with the various granulating methods currently put into practice.

Therefore, granules formed by this method has the problem of being easily destroyed because it contains flocculated lumps without binder inside.

In addition, in the case where compression moldings (tablets) are made by using this granule containing flocculated lumps without binder inside, the flocculated lumps inside the granule change, under pressure, into hard lumps which are not easily dispersed at the time of dissolution. This is due to the absence, between primary particles, of any binder which serves as a dispersing agent at the time of dissolution, and such phenomenon spoils the effect or meaning of pulverization of raw material, etc. made for any specific purpose such as improvement of solubility, for example.

As described above, it has so far been considered impossible to perform fluidized bed granulation of light fine powders or to perform fluidized bed granulation while coating individual particles constituting flocculated lumps which consists of light fine powder with a binder.

SUMMARY OF THE INVENTION

The object of the present invention is to provide a method enabling granulation of powder such as light fine powder, etc., and more specifically granulation made while coating individual primary particles constituting flocculated lump which consists of light fine powder with a binder, and an apparatus for it.

To achieve the above-mentioned object, the method of granulating powder according to the present invention is a method of granulating powder comprising the steps of; mixing a powder and a mist of binder by fluidizing air flow, collecting the mixture of the powder and the binder on a filter surface thereby forming a powder layer thereon, peeling off the powder layer from the filter surface thereby crushing the powder layer into pieces, returning the crushed fragments into the fluidizing air flow and mixing them with the mist of binder again, repeating the steps until the desired granule is obtained.

In this case, if a binder is spotted on the surface of flocculated lumps formed with flocculation of a large number of primary particles and the flocculated lumps are collected on a filter and, after point combining, crushed from a portion not combined with the binder, flocculated lumps are formed on the surface of which appear the primary particles which have so far been positioned inside the flocculated lumps. By returning those flocculated lumps into the powder and repeating the granulating and crushing operations, secondary particles which are coated with the binder on all the individual primary particles are obtained.

Granulation can be made by incorporating the method of granulating powder according to the present invention in the conventional granulating method utilizing air flow. Here, granulating method utilizing air flow includes such granulating methods as spouted bed granulating method, roll granulating method, complex granulating method, etc. in addition to fluidized bed granulating method.

Moreover, the structure of the granulating apparatus according to the present invention can be incorporated in said conventional general apparatus for granulating powder by using air flow. Its construction is characterized in that it disposes, on the inner circumferential face of a closable main body container, a filter for forming a powder layer consisting of powder and binder in a way to form a space against the inner circumferential face of the main body container, and a backwash and exhaust mechanism which selectively performs backwash or exhaust through this filter.

Furthermore, apart from said general granulating apparatus, the apparatus according to the present invention is characterized in that it has the central part at the top face of the main body container depressed and disposes a spray nozzle at the center of that part, disposes a filter for forming a powder layer consisting of powder and binder on the top face around it in a way to form a space against the top face, and disposes a backwash and exhaust mechanism which selectively performs backwash or exhaust through this filter.

Still more, it is possible to divide said space into a plural number of zones by such way as splitting it into zones disposed one upon another in the vertical direction of the main body container for example, in a way to form a plural number of ring-shaped zones, suck and hold the filter by performing exhaust through the filter in zones other than the zone where backwash is being performed, and backwash the filter while keeping it at prescribed position, for effective backwashing.

By the method and apparatus according to the present invention, it becomes possible to not only perform granulation with the following features but also effectively perform granulation processing of powder including the manufacture of powder by spray-dry.

(1) Enables granulation of light fine powder of a particle size no larger than several gm which may fly up without forming any fluidized bed.

(2) Enables manufacture of granulated products with excellent solubility and strong binding force, thanks to the possibility of obtaining granule consisting of primary particles which are coated with a binder about uniformly on the surface.

(3) Enables uniform granulation of all powdery materials without non-granulated powder in granulated products.

(4) Enables granulation in uniform size without coarse granules in granulated products.

(5) Enables granulation in a state of low water content when granulating a powdery material which is liable to cause hydrolysis.

(6) Enables manufacture of granulated products with uniform composition, when granulating several different kinds of easily classifiable powdery materials.

DETAILED DESCRIPTION OF THE INVENTION

The powder forming the subject of the present invention is a light fine powder having properties of flying up without forming any fluidized bed and of being caught by a filter and other similar powders. Such properties of flying up without forming any fluidized bed and of being caught by a filter have been positively utilized to invent a method of granulating light fine powder up to a size enabling formation of a fluidized bed.

This new granulating method is a method which includes blowing up light fine powder with a fluidizing air flow, spraying a binder on the blown-up powder, mixing the powder and the mist of binder with a fluidizing air flow and collecting the mixture on a filter. Thereby forming a high-density powder layer on the filter in such a way as to mutually combine the particles inside this high-density powder layer. This layer is peeled off from the filter and crushed into pieces with the backwashing of this powder layer. The crushed fragments are returned into the fluidizing powder, flown up, mixed with the mist again and collected on a filter. These operations are repeated to finely granulate the powder.

The apparatus used for performing granulation by this method will be explained hereafter by comparison with a conventional apparatus.

Figure 2:
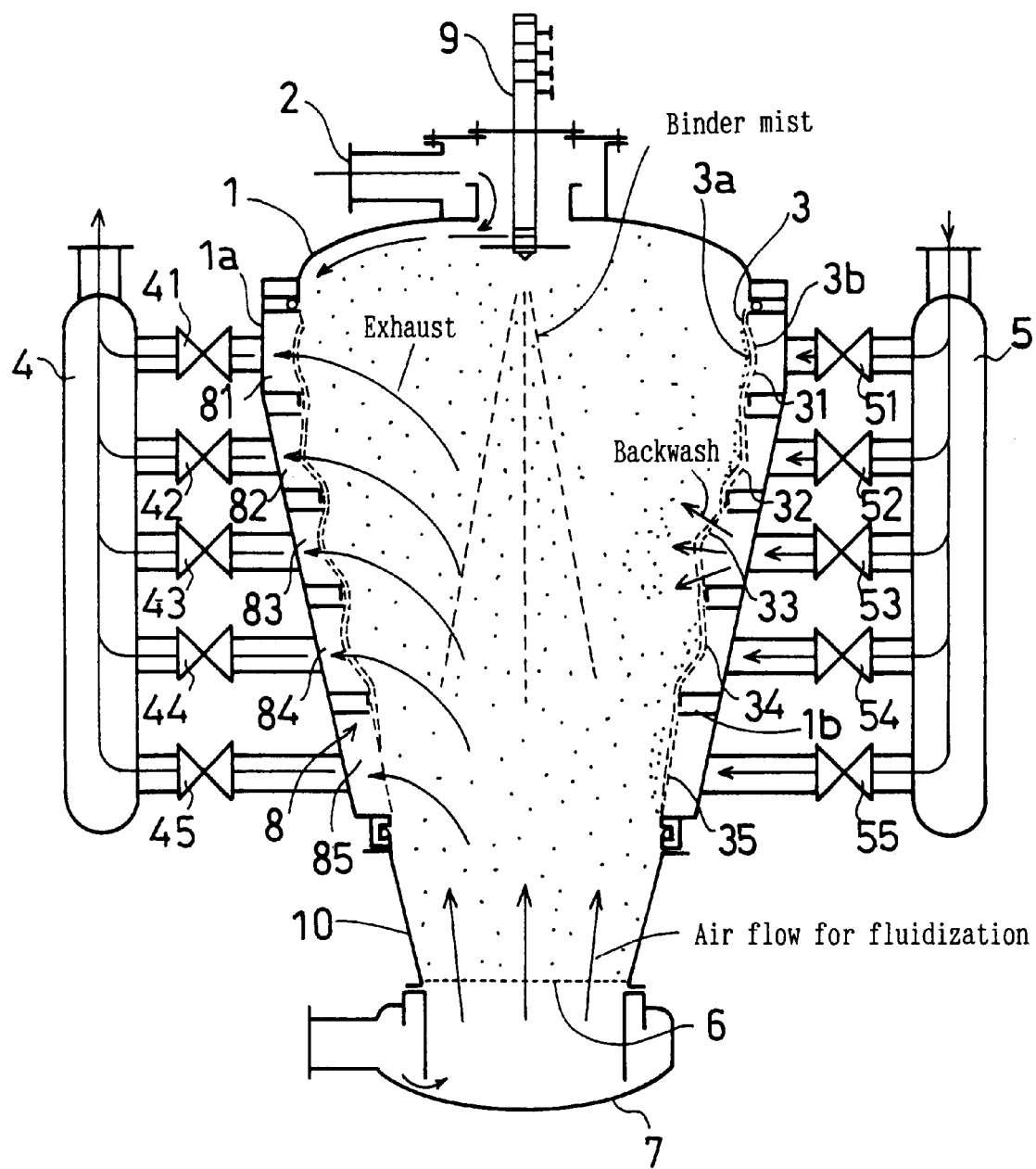
FIG. 2 is a front vertical section showing an example of an apparatus for granulating powder according to the present invention.

The apparatus of this invention, as shown in FIG. 2, includes a sealed main body container 1, and a filter 3 which is disposed apart from the inside wall 1a of the main body container 1 so as to form an intermediate exhaust chamber 8. A top air supplying conduit or chamber 2 is mounted at the top of the main body container 1, and a product container 10 is disposed at the bottom of the main body container 1. A screen plate 6 is disposed at the bottom of the product container 10, a bottom air supplying chamber 7 is disposed below the product container 10, and a spray nozzle 9 is disposed at the top-center of the main body container 1, which sprays a binder therein.

Fluidizing air is supplied from the bottom air supplying chamber 7 and through the screen plate 6 thereby fluidizing and mixing powder inside of the main body container 1.

Also, this apparatus is constructed in such a way that the air flow supplied from the top air supplying chamber 2 and the bottom air supplying chamber 7 into the main body container 1 passes through the filter 3 and is discharged to the outside of the main body container 1.

The filter 3 is constructed such that it will allow the passage of air, etc. but it will prevent the passage of light fine powder. The filter is a double-layer structure having an inner filter 3a of woven fabric of Tetoron disposed on the inner side (center side of the main body container 1) and an outer filter 3b of non-woven fabric of Tetoron. At least the outer filter 3b is divided, as described later, into a first filter 31, second filter 32, a third filter 33, a fourth filter 34 and a fifth filter 35 in this order from the top.

This apparatus is therefore constructed so as to form a plurality of zones with the respective filters 31, 32, 33, 34, 35 and the wall 1a and the partition ring 1b of the main body container 1. This arrangement forms ring-shaped intermediate exhaust chambers 81, 82, 83, 84, 85 which make it possible to selectively perform exhaust or backwash operations independently of each other by means of an exhaust mechanism 4 and a backwash mechanism 5 connected to the respective intermediate exhaust chambers 81, 82, 83, 84, 85.

In this case, the intermediate exhaust chambers 81, 82, 83, 84, 85 are connected to the exhaust mechanism 4 through exhaust valves 41, 42, 43, 44, 45 and to the backwash mechanism 5 through backwash valves 51, 52, 53, 54, 55 respectively.

Also, the exhaust valves 41, 42, 43, 44, 45 and the backwash valves 51, 52, 53, 54, 55 are constructed in such a way that, while either one of the valves is open to one intermediate exhaust chamber, the other valve is closed.

Moreover, the outer filter 3b is joined with the partition ring 1b at both ends of the respective filters 31, 32, 33, 34, 35 while the inner filter 3a is connected to the partition rings 1b at the top end of the first filter 31 and at the bottom end of the fifth filter 35.

As the exhaust mechanism 4 and the backwash mechanism 5 operate to exhaust and backwash the filter 3, the filter 3 can suck material at one part while the sucked material peeled and crushed at another part. Namely, as the exhaust valves 41, 42, 43, 44, 45 are opened and the backwash valves 51, 52, 53, 54, 55 are closed, the exhaust mechanism 4 performs exhaust operations from inside the main body container 1 through the filter 3 making it possible for the filter 3 to suck material and, in the opposite case, the backwash mechanism 5 feeds compressed air for backwashing material, which has been caught by the filter 3, into the main body container 1, enabling peeling of the material from the filter 3.

In this case, the backwash valves 51, 52, 53, 54, 55 are usually opened sequentially from top to bottom (they can also be opened from bottom to top or in any desired order) to backwash the filter 3 and peel the material on the filter 3.

The opening time of the backwash valves 51, 52, 53, 54, 55 can be set short because this peeling of substance can be completed in a short time.

Next, explanation will be given on the motion of exhaust valves and backwash valves during operation. First, basically the five exhaust valves 41, 42, 43, 44, 45 are left open. Then a first exhaust valve is closed and the corresponding backwash valve is opened for an instant, for one second for example, and closed immediately after that, and the exhaust valve is opened. After that, this operation is repeated in a set sequence, from top to bottom for example.

As described above, since at least 4 of the 5 exhaust valves 41, 42, 43, 44, 45 are left open, it is possible to not only perform exhaust by utilizing at least 80% of the surface area of the filter 3 but also to suck and hold the inner filter 3a, which is connected to the partition ring 1b only at the top end and the bottom end and perform backwash smoothly.

Figure 1:
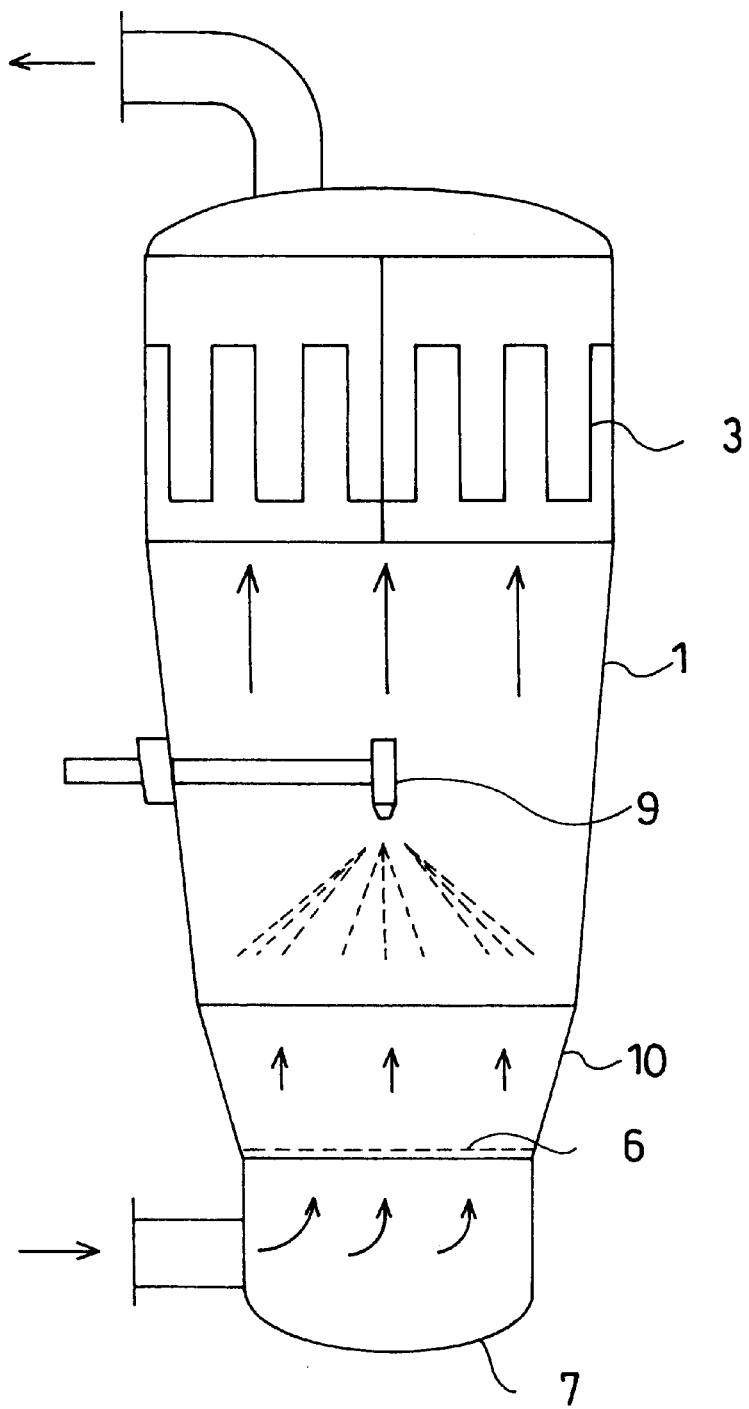
FIG. 1 is a front vertical section showing a conventional fluidized bed granulating apparatus.

On the other hand, in a conventional fluidized bed granulating apparatus, a filter 3 is disposed at the top of the container, as shown in FIG. 1. In the case where this filter is disposed in a flat shape in such a way as to cover the inner circumferential face of the main body container 1, as in the apparatus which performs fluidized bed granulation of light fine powder according to the present invention indicated in FIG. 2, it becomes easy to catch the light fine powder flying up from the product container 10, and the return of collected powder to the product container 10 after dusting it off by backwashing also becomes easier because of the short distance.

Moreover, by disposing the filter 3 in such a way as to cover the inner circumferential face of the main body container 1, a solution to the problem of adhesion of powder to the inner face of the main body container 1 is provided.

Furthermore, with the use of a flat filter without pleats, etc. for the filter 3, peeling of the powder layer becomes easier.

The binder nozzle 9 will be a top spray type and will be mounted on the top face of the main body container 1. The height of nozzle 9, which varies depending on the nature of the powder and the binder as well as the apparatus size, will be normally set at about double the nozzle height in a conventional apparatus.

Next, explanation will be given on countermeasures against flocculated lumps which has been considered as a big problem in the granulation of light fine powder, namely the method of coating binder on each piece of the primary particles while loosening the flocculated lump.

Destruction of flocculated lumps is impossible even with fluidization and agitation of the powder with a forced air flow or an agitating blade by using a conventional fluidized bed granulating apparatus, a spouted bed granulating apparatus, a roll granulating apparatus, or a complex granulating apparatus, and instead the lump may even grow larger in some cases.

Therefore, a method of destroying the flocculated lump by using a binder mist has been invented.

First, a volume of the binder mist which is smaller than normal is provided on the surface of the flocculated lump. And, as the flocculated lumps are collected on the filter together with other powder and binder mist, thus forming a high-density powder layer on the filter, the binder mist gets in the state of existing here and there on individual particles inside the powder layer, and only the portion with such spots produces a combination.

Next, in the case where the powder layer is peeled from the filter and crushed into pieces, the crushing of the powder layer takes place with respect to a portion which is not combined with binder, in other words from a flocculated portion.

This means that the first flocculated lump has been crushed from inside and, by repetition of this operation, it becomes possible to granulate the first flocculated lump while crushing it and coat the individual particles of that lump with binder while loosening the flocculation.

Therefore, by the combined use of said new granulating method and the method of loosening flocculation with the mechanism of apparatus shown in FIG. 2, it becomes possible to granulate flocculated lumps consisting of light fine powder to a size which will enable the formation of a fluidized bed from primary particles and, with continued fluidized bed granulation, obtain granules of good quality.

Figure 3:
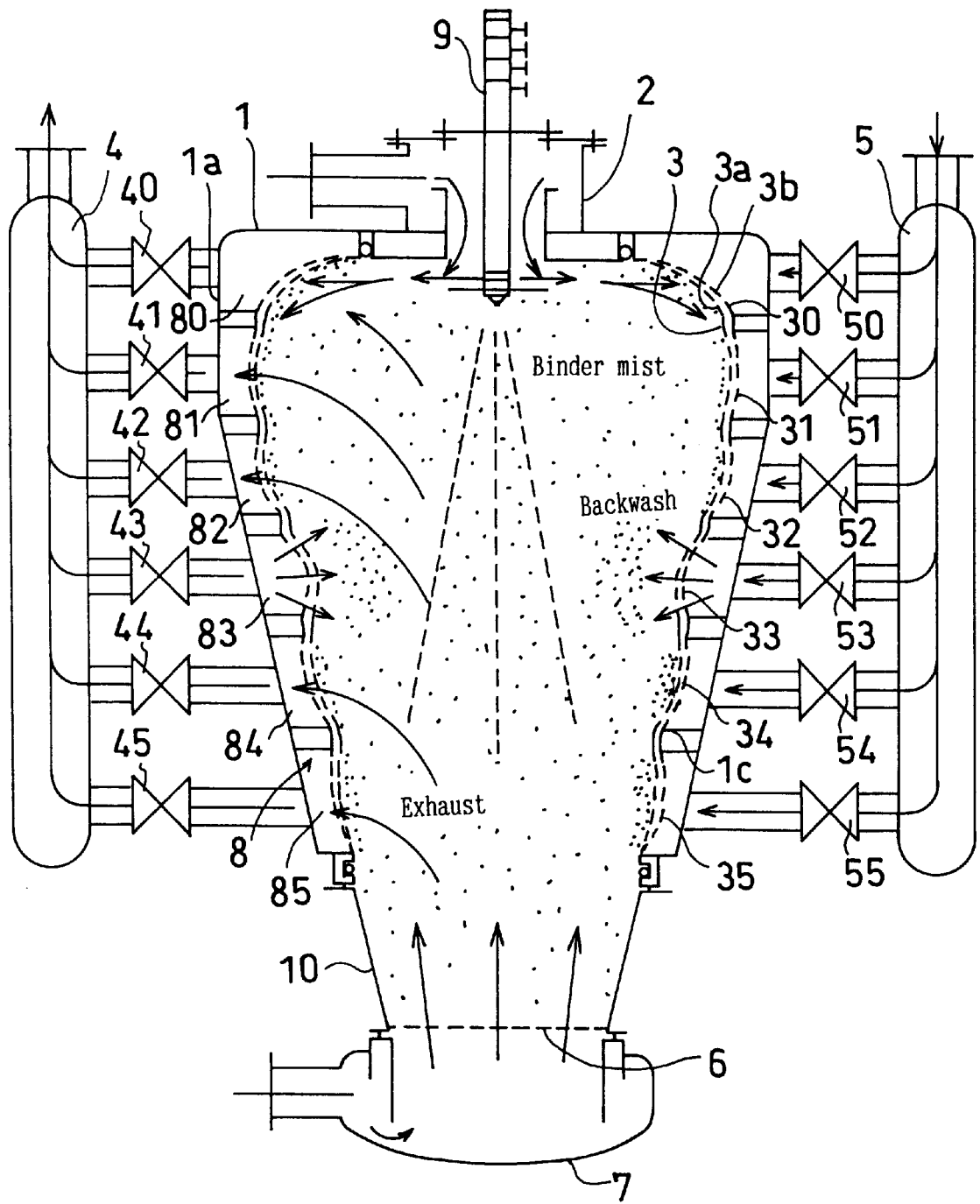
FIG. 3 is a front vertical section showing a modified example of the apparatus for granulating powder according to the present invention.

Next, FIG. 3 illustrates a modified example of the apparatus for granulating powder as shown in FIG. 2.

This apparatus is constructed in such a way that the first filter 31 of the powder granulating apparatus indicated in FIG. 2 is extended up to the corner at the top of the main body container 1, in other words to the connecting part between the top face of the main body container 1 and the wall 1a so as to form a top filter 30. Also, in the same way as the other filters 32, 33, 34, 35, demarcation is made with the wall 1a, the top face of the main body container 1 and the partition ring 1b to thereby form a ring-shaped intermediate exhaust chamber 80. This makes it possible to selectively perform exhaust or backwash operations independently of the other filters 31, 32, 33, 34, 35 by means of an exhaust mechanism 4 and a backwash mechanism 5 connected to the intermediate exhaust chamber 80.

In this case, the intermediate exhaust chamber 80 is connected to the exhaust mechanism 4 through exhaust valve 40 and to the backwash mechanism 5 through backwash valve 50 respectively.

Also, the exhaust valves 40, 41, 42, 43, 44, 45 and the backwash valves 50, 51, 52, 53, 54, 55 are constructed in such a way that, while either one of the valves is open to one intermediate exhaust chamber, the other valve is closed.

Moreover, the apparatus is constructed in such a way that the outer filter 3b is joined with the partition ring 1b at both ends of the respective filters 30, 31, 32, 33, 34, 35 while the inner filter 3a is joined with the partition ring 1b at the top end of the top filter 30 and at the bottom end of the fifth filter 35.

This makes it possible to not only prevent matter from adhering to the corner at the top of the main body container 1, namely to the connecting part between the top face of the main body container 1 and the wall 1a, but also to suck and peel matter which has collected at the top filter 30, thus enabling effective granulation.

Other constructions and operations of the apparatus illustrated in FIG. 3 are the same as those of the apparatus shown in FIG. 2.

The process of fluidized bed granulation of light fine powder, using the apparatus of FIG. 2 or FIG. 3, will be explained hereafter with reference to FIG. 4 to FIG. 8.

Figure 4:
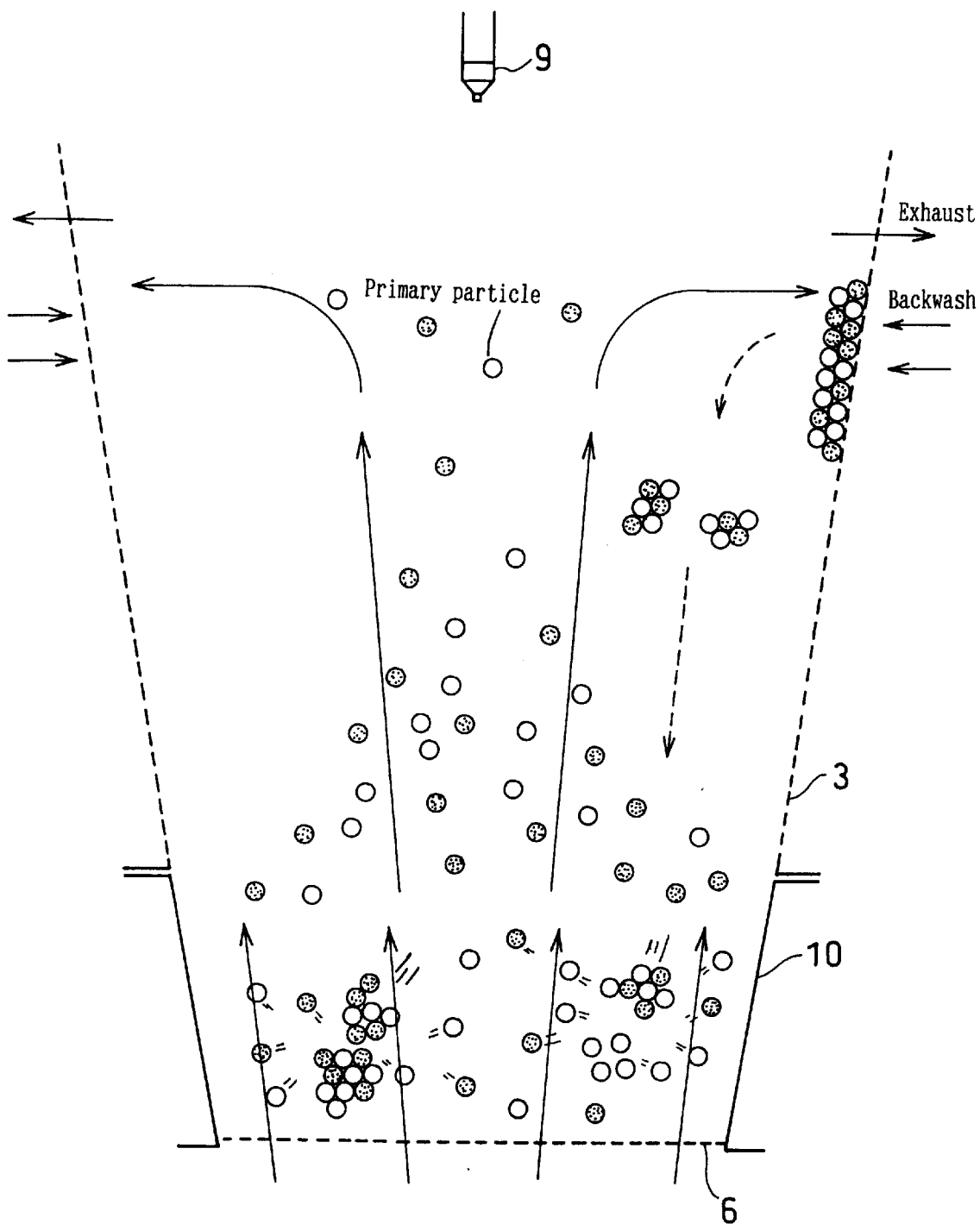
FIG. 4 is a schematic diagram showing the fluidizing and blending process of powder in granulating step 1, of a method of granulating powder according to the present invention.

FIG. 4 is a schematic diagram showing the fluidizing and blending process of powder in granulating step I.

As shown in FIG. 4, the light fine powder in the product container 10 flies up at the moment when fluidizing air flow is fed into the main body container 1 from the bottom of the product container 10. The powder, carried by the fluidizing air flow, hits against the filter 3 disposed on the inner circumferential face of the main body container, and is caught by the filter 3.

The light fine powder forms a filtration layer, and it is possible even for a general filter 3 made of woven fabric of Tetoron, etc. to collect fine powder in units of a submicron order.

Even after formation of filtration layer, light fine powder continues hitting against the filter 3 and sticking to the surface of the filter 3. The light fine powder adhering to the surface of the filter 3 is peeled from the filter 3 and dropped to the bottom of the product container 10 as flocculated lumps with backwashing which is performed in regular cycles.

The flocculated lumps which are pulverized as a result of collisions among the flocculated lumps themselves, etc., fly up again by riding on the fluidizing air flow introduced into the main body container 1 from the bottom of the product container 10, and stick to the surface of the filter 3.

This operation is repeated and, as a result, even light fine powder which cannot form a fluidized bed in the main body container 1 comes to be fluidized and mixed eventually by going to and from the surface of the filter 3 and the bottom of the product container 10. In the case of an easily classifiable powder, though it is divided into a part that forms a fluidized bed at the bottom and the other part that flies up the polarized two (2) different kinds of powder are mixed uniformly again in the granulation process to be described later if they are well mixed, and do not present any particular problem in the case of ordinary powder.

Figure 5:
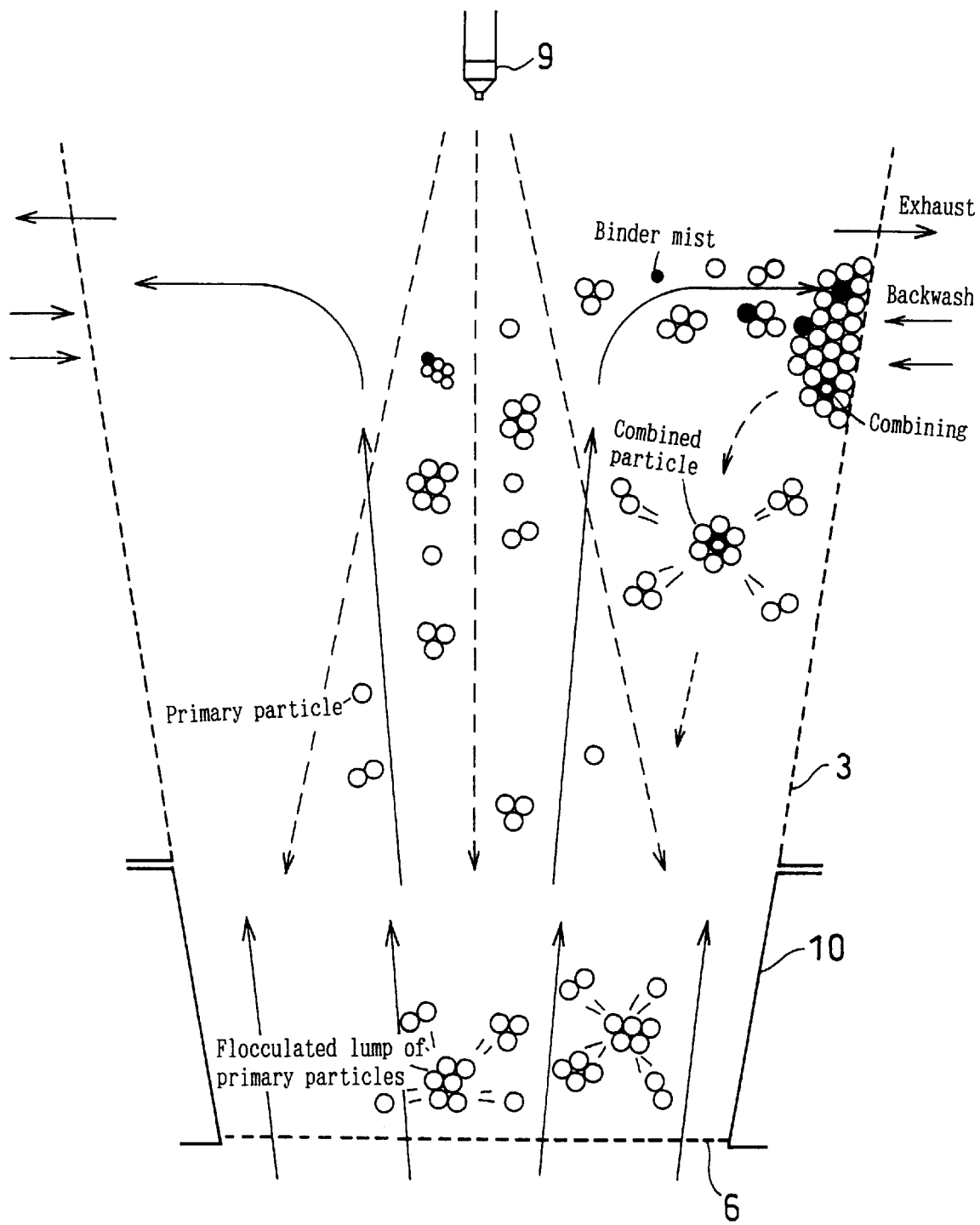
FIG. 5 is a schematic diagram showing a deflocculating process of powder in the granulating step II, of the method of granulating powder according to the present invention.

FIG. 5 is a schematic diagram showing the deflocculating process of powder in the granulating step 11.

A binder is sprayed from the nozzle 9 onto the flocculated lump formed in the granulating step 1. In case the whole surface of the flocculated lumps are coated with binder, a sudden granulation will occur. To prevent this phenomenon, it is preferable to limit the amount of the binder to within 40 to 60% of hot air drying capacity and to spray mist with a diameter less 10 μm.

Moreover, the volume of mist advancing air fed from the binder nozzle 9 is adjusted in such a way that the spray travel of the binder mist comes from the top or upper end of the product container 10. This avoids the phenomenon of self drying of the binder mist by making it reach the filter quickly, and thus prevents drying and pulverization of heavy flocculated lumps fluidizing at the lower part of the container 10.

As a result, the binder mist is spotted on the surface of the flocculated lumps. The flocculated lumps are collected with other powder and the binder mist on the filter 3 so as to form a powder layer, in which the particles of the binder mist exist in spots, where the binding takes place.

Next, the powder layer on the filter 3 is peeled and crushed into pieces with backwashing which is performed in regular cycles. At that time, the powder layer is destroyed, not at the portions that adhere with a strong binding force, but at the flocculated portions which are held with weak binding forces. The crushed layer drops in the product container 10.

Fragments of the powder layer are further dried in the product container 10 which causes pulverization thereof, but the adhering particles are not destroyed but ride up on the fluidizing air flow as flocculated lumps containing adhering particles.

The surfaces of the flocculated lumps are spotted again with the binder mist, to form a powder layer on the filter 3 in the same way as before and, inside the formed powder layer, the newly sprayed binder mist is present in spots which, cause new combinations in those portions only.

As this operation is repeated, the binder mist is eventually coated on all primary particles because priority of coating is given to primary particles which have not yet been coated with the binder mist.

Also, adhering particles also increase gradually to generate secondary particles consisting of tens of primary particles. However, since this process is that of granulation in a dry state and the secondary particles lack water content and plasticity, continued granulation in this state may produce granules of high porosity, having small bulk density and weak strength. Therefore, in order to give the secondary particles the necessary plasticity, following is the next step of the primary granulation process in which an increased volume of binder spray is supplied.

Figure 6:
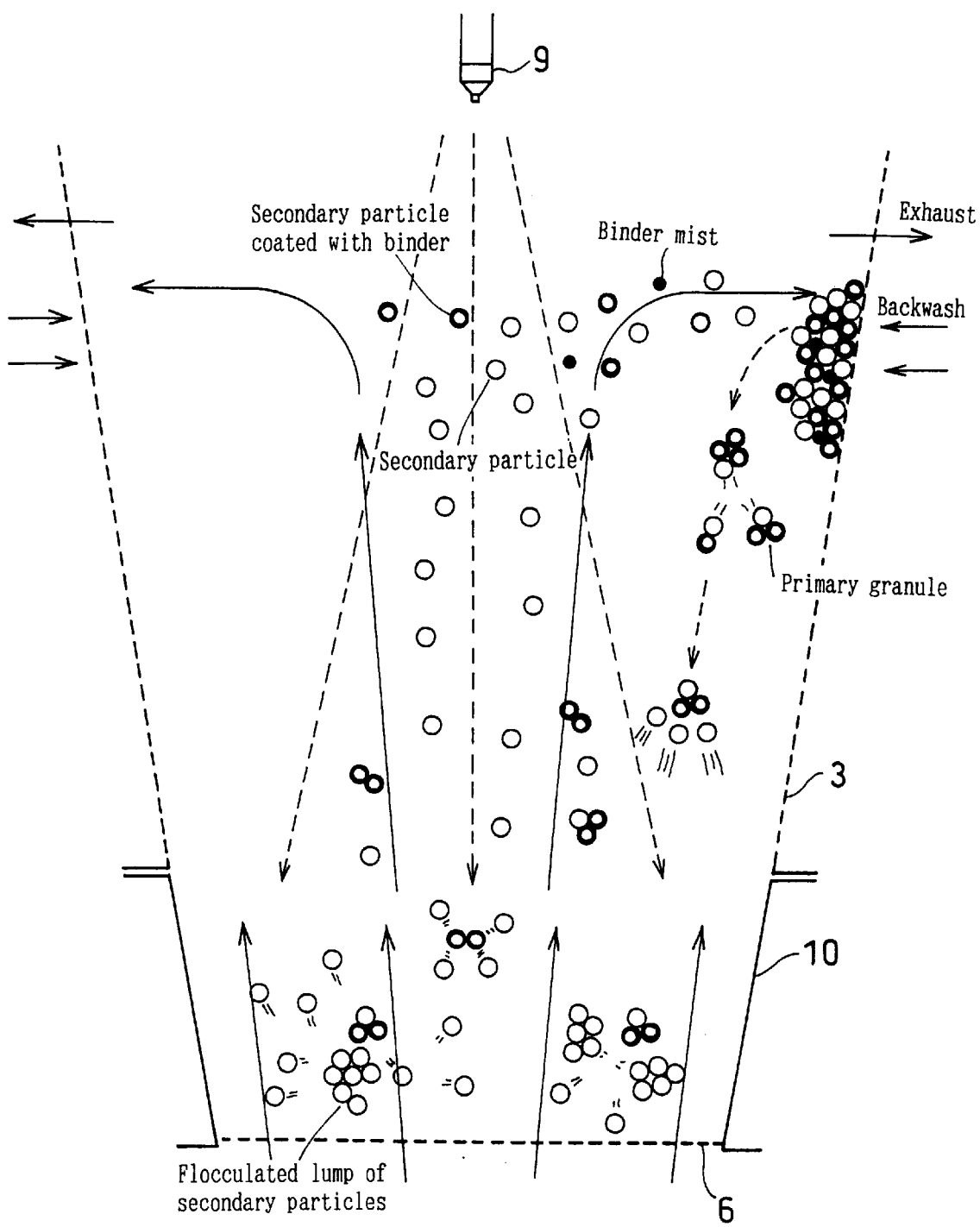
FIG. 6 is a schematic diagram showing the initial granulating process of powder in granulating step III, of the method of granulating powder according to the present invention.

FIG. 6 is a schematic diagram showing the initial granulating process of powder in granulating step III.

In the initial granulation process, the volume of binder sprayed from the binder nozzle 9 is increased to a volume corresponding to 90 to 95% of the hot air drying capacity for spraying on the secondary particles.

The secondary particles become soft as they get wet by sufficiently containing the binder mist. And, these secondary particles rise up on the fluidizing air flow together with other dry and hard secondary particles and binder mist, and are collected on the filter 3 to form a high-density powder layer.

Inside this powder layer are produced a portion in which soft secondary particles, wet with binder mist, are combined with a portion which remains in a dry and hard state.

In FIG. 6, secondary particles which are wet by containing a sufficient amount of binder, are represented by thick circles.

Next, by backwashing, the powder layer is destroyed, thereby generating primary granules.

The primary granules drop because they are wet and heavy with binder and due to mutual combining of secondary particles, or drop on the screen plate 6 of the product container 10, were they hit against and crush and pulverize residual flocculated lumps, while the primary granules themselves are dried on the screen plate 6 of the product container 10 and partially pulverized.

In the initial granulating process of powder in granulating step 111, granulation progresses on the filter 3 though no fluidized bed is formed, and the particle diameter of the primary granules gradually increases (this granulation is specially called & "granulation on the filter" as distinguished from fluidized bed granulation).

Figure 7:
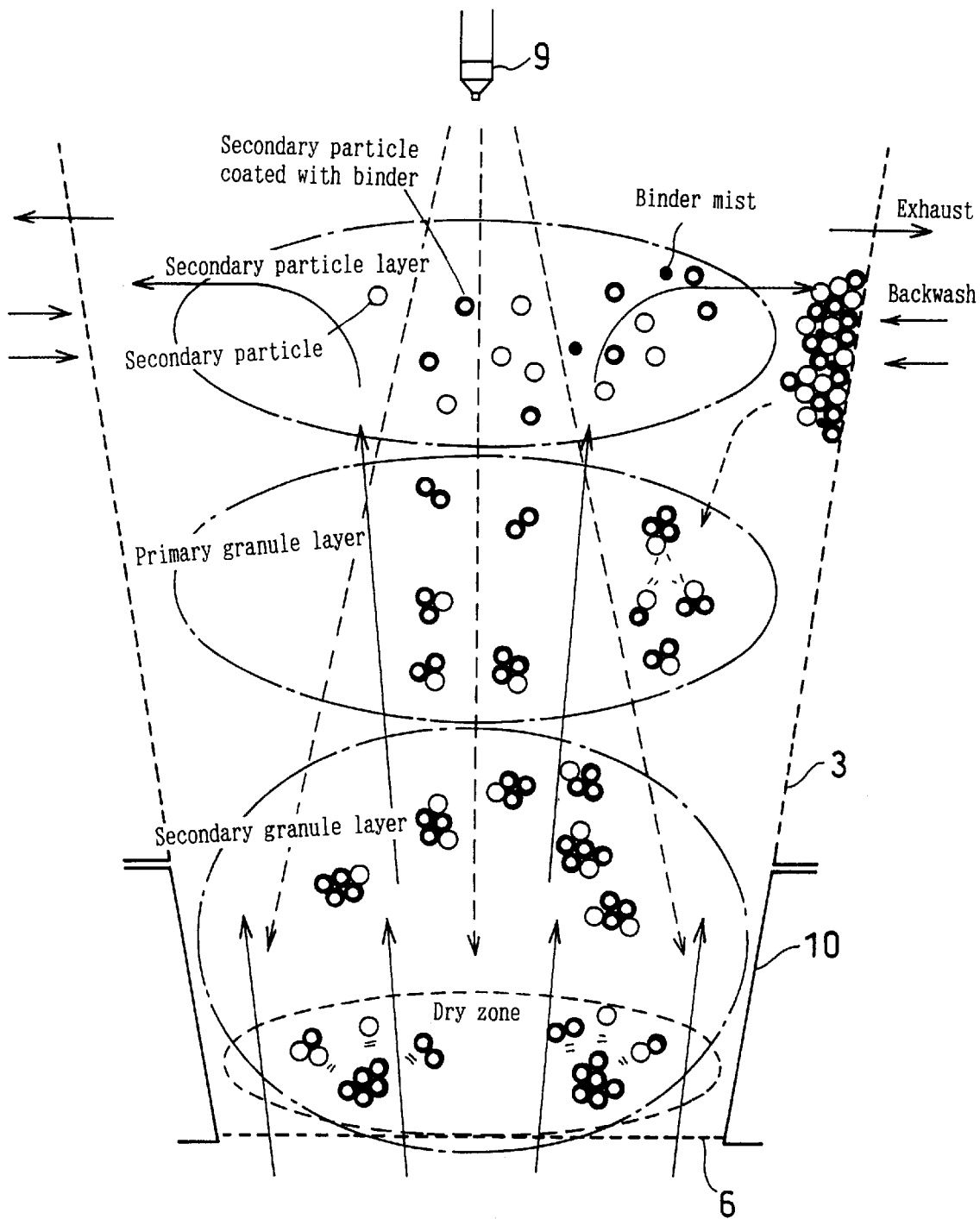
FIG. 7 is a schematic diagram showing the intermediate granulating process of powder in granulating step IV, of the method of granulating powder according to the present invention.

FIG. 7 is a schematic diagram showing the intermediate granulating process of powder in granulating step IV.

As granulation on the filter is repeatedly performed by the initial granulating process of powder in the granulating step III shown in FIG. 6, the operation gets into an intermediate granulating process of powder in the granulating step IV shown in FIG. 7.

In this intermediate granulating process, granulation on the filter is performed and the granules, which grew into granules of a particle size of 40 to 50 µm as a result of that granulation, come to form a fluidized bed under a layer of secondary particles which have been made to fly up. Also, as the mist advancing air from the binder nozzle 9 is intensified to make the binder mist reach the fluidized bed, fluidized bed granulation also starts to occur at the same time, making the granules spherical.

Namely, the inside of the main body container is now in a stratified state having a secondary particle layer, a primary granule layer and secondary granule layer from top to bottom in this order. Granulation on the filter is performed at the upper secondary particle layer, and the top of the primary granule layer while fluidized bed granulation takes place at the bottom of the primary granule layer and in the lower secondary granule layer.

As this apparatus is a top spray type, a lot of binder mist is consumed in the secondary particle layer at the top where quick granulation is desired, but only a small amount of binder mist reaches the secondary granule layer at the bottom. For that reason, drying and pulverization also take place at the same time in the secondary granule layer at the bottom.

Namely, as secondary particles are actively granulated in the top layer while generated granules are slowly pulverized due to weaker binding forces in the bottom layer, the granulation process progresses while adjusting the particle size as a result.

Figure 8:
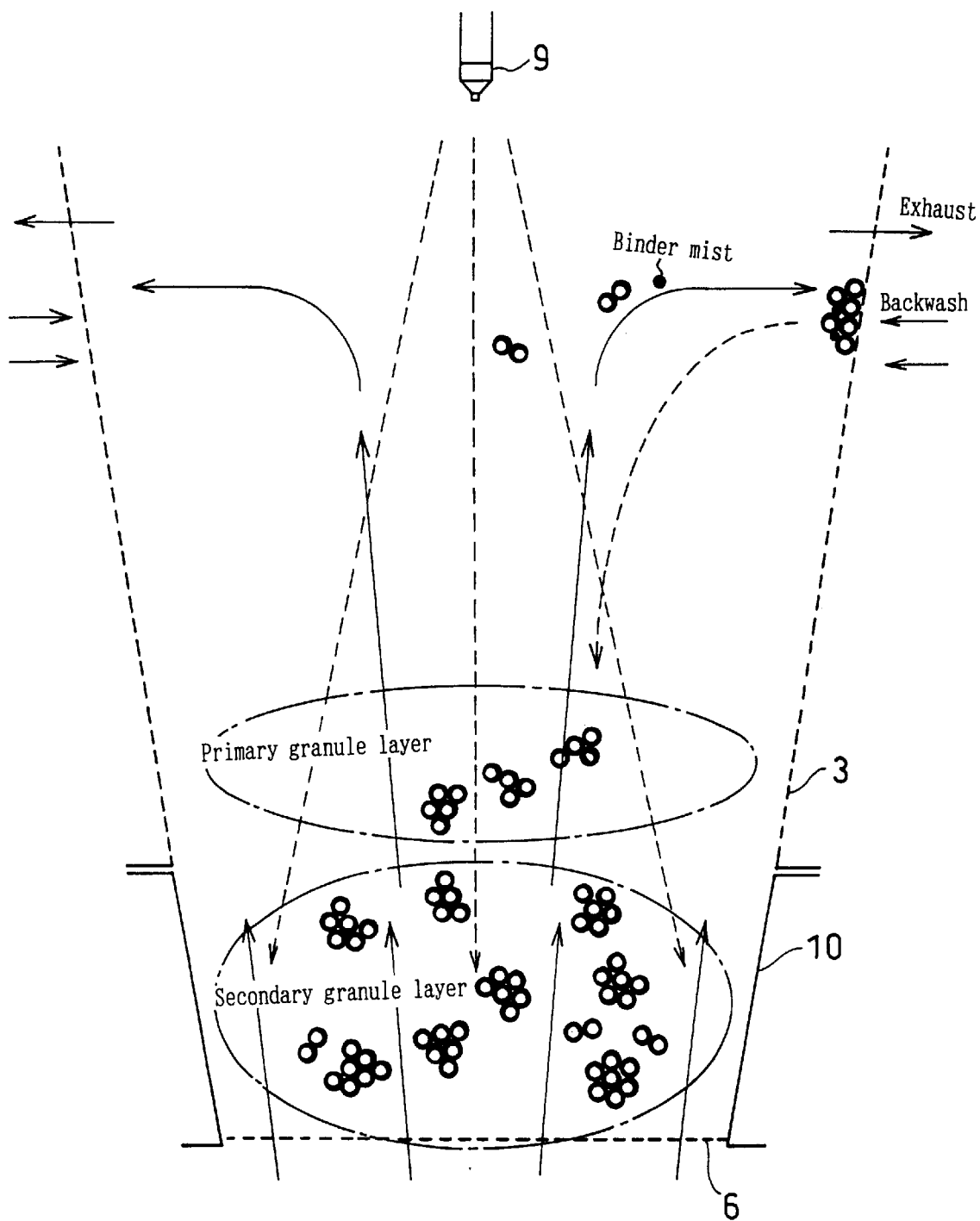
FIG. 8 is a schematic diagram showing the regular granulating process of powder in granulating step V, of the method of granulating powder according to the present invention.

FIG. 8 is a schematic diagram showing the regular granulating process of powder in the granulating step V.

In the regular granulating process of powder in the granulating step V shown in FIG. 8, the granulation of the powder progresses and the secondary particle layer disappears. Then, the binder mist, which has so far been consumed in this layer, comes to be fully supplied to the fluidized bed, and the granules which grew into powder of a particle size of 80 µm or so are rapidly granulated by fluidized bed granulation. However, there is something different from ordinary fluidized bed granulation. The differences mean that the granules are comparatively dry because they formed in a dry zone in the bottom layer up to the granulating step IV. In addition, the granules are wetted only on the surface in this process, thereby keeping large granules hard, and small granules which became soft with wetting are combined with those large hard granules. Therefore, as the sprayed amount of binder mist is set within the drying capacity of hot air, granulation progresses in a state of low water content and part of the granules are pulverized.

However, since granulation on the filter is possible also in the regular granulating process, the powder which flew up after pulverization is subjected to granulation on filter and returned into the fluidized bed as easily granulated flaky granules wet with binder. Such a mechanism provides granules of uniform particle size. Moreover, as granules of loose binding force are pulverized and granulated again, this eventually produces granules with a strong binding force.

Next, the process of growth of particles produced in the processes from initial granulation to regular granulation described above is schematically indicated in FIG. 9.

Figure 9:
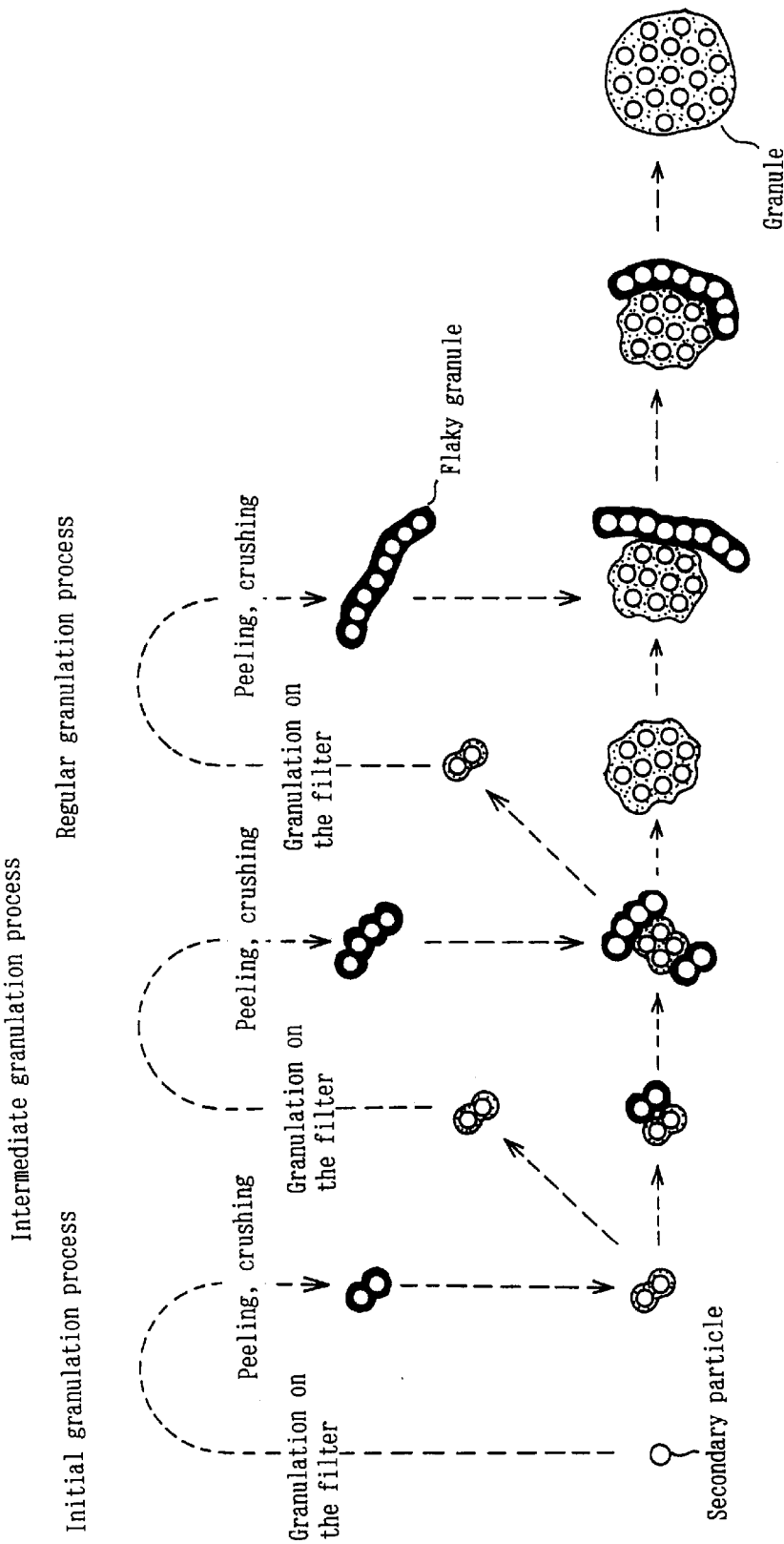
FIG. 9 is a schematic diagram showing a growing process of particles from initial granulating process to regular granulating process of the method of granulating powder according to the present invention.

In FIG. 9, a thick line indicates portions coated with binder, while a dotted line represents portions in which the coated binder has dried up.

Such are the purpose by processes of granulation and the sequence of actions. Their qualitative effects will be enumerated hereafter.

(1) By granulating on the filter, all of the powder is granulated after being collected, forming a high-density powder layer on the filter 3. As a result, there remains no ungranulated powder and the distribution of particle size is normalized.

(2) A combination of granulation on the filter and fluidized bed granulation enables granulation in a state of low water content in the fluidized bed at the bottom. This prevents production of coarse grains and normalizes the distribution of particle size.

(3) All processes are performed in a state of low water content with no production of false granules (granules without crosslinkage, which are solidified lumps produced with moisture), providing granules of strong binding force. Hence there is little pulverization in the drying process.

(4) The granules, which are produced by coating the binder on each of the individual particles, are strong and easy to melt.

(5) In the case where granulation on the filter and fluidized bed granulation are combined and put in the state of intermediate period of granulation, granules of uniform composition are obtained even with several different kinds of powder which are liable to be classified, because priority is given to the powder with smaller particle size in the granulation and the regular granulation process starts after the powder gets in a state of even size not easily classified from one another.

Next, an apparatus for granulation on the filter with spray-dry function for implementation of the present invention will be explained hereafter with reference to FIG. 10 and FIG. 11.

It is to be noted, however, that this apparatus is intended to illustrate the technical concept of the present invention and that the present invention is not restricted to this specific apparatus.

Figure 10:
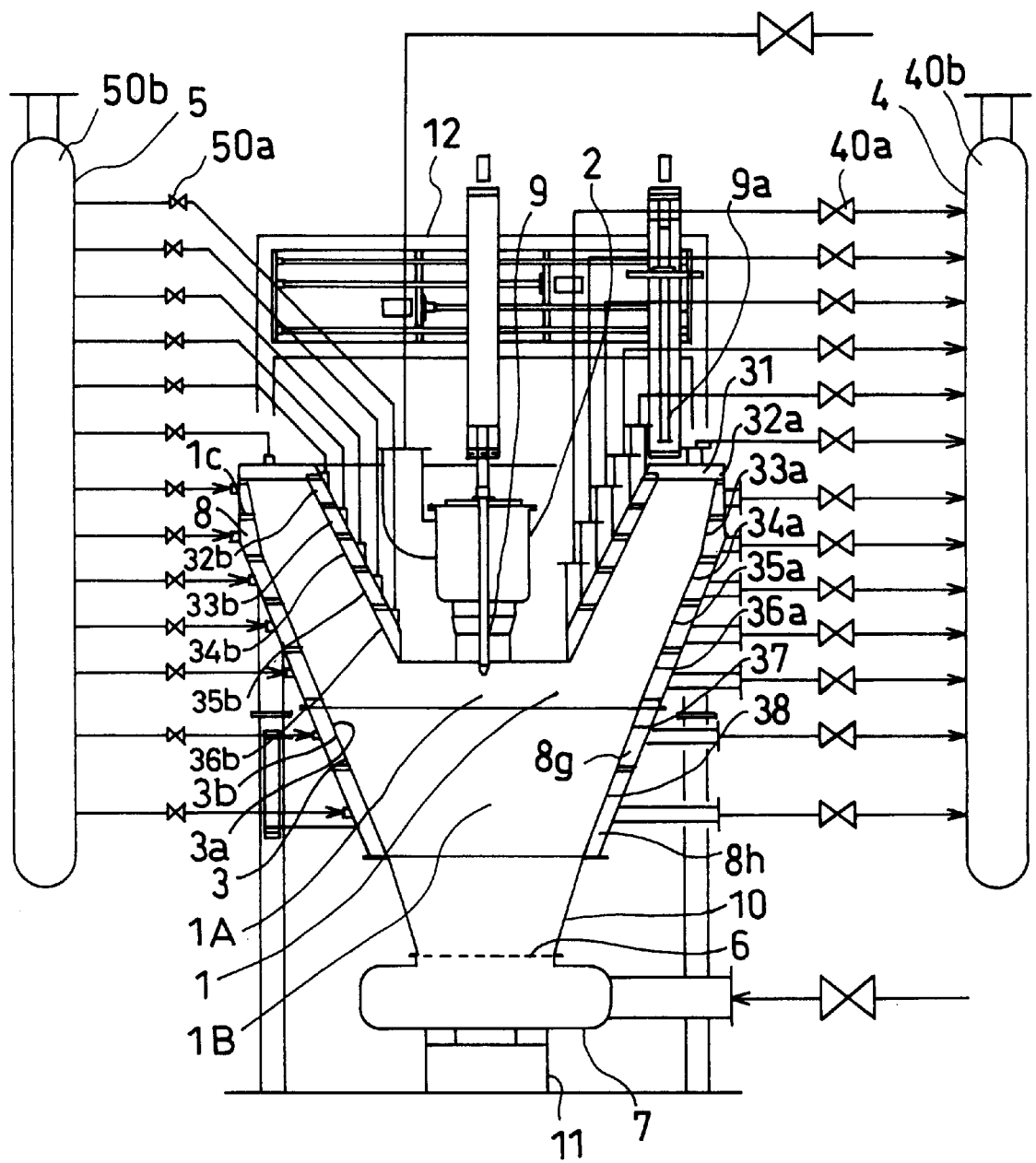
FIG. 10 is a vertical section showing an apparatus for granulating on a filter with a spray-dry function.

First, the apparatus illustrated in FIG. 10, which is different in shape from an ordinary fluidized bed granulating apparatus, is constructed by splitting the main body container into an upper structure 1A and a lower structure 1B, and depressing a central part of the top face of the upper structure 1A.

This construction makes it possible to maintain a constant distance from the binder nozzle 9 to the fluidized bed regardless of the apparatus size, and makes the sprayed binder mist reach the fluidized powder.

Moreover, since the distance between the top face of the main body container 1 and the fluidized bed is comparatively short, it also becomes possible to scrape down the powder adhering to the top face as part of the granules hit against that top face during granulation even in the case of granulation of highly adhesive powder.

Furthermore, a filter cloth 3 is disposed on the inner circumferential face of the main body container 1. In this case, it is possible to increase the filtration surface area by also disposing a filter cloth 3 on the inner circumferential face of the inner cylinder formed by depressing the top face of the upper structure 1A of the main body container 1.

The filter cloth 3 is constructed by three pieces of filter cloth having shapes that are different from one another, namely a first filter cloth which is divided into six zones, 31, 32a, 33a, 34a, 35a, 36a, disposed on a flat part of the top face of the upper structure 1A of the main body container 1 and on the inner circumferential face of the outer cylinder, a second filter cloth which is divided into five zones, 32b, 33b, 34b, 35b, 36b, disposed on the inner circumferential face of the inner cylinder formed by depressing the top face of the upper structure 1A of the main body container 1, and a third filter cloth which is divided into two zones, 37, 38, disposed on the inner circumferential face of the lower structure 1B of the main body container 1.

Further filter 3 is constructed in such a way as to allow the passage of air, etc. but to prevent the passage of light fine powder. Namely, it is a double-layer structure having an inner filter 3A of woven fabric of Tetoron disposed on the inner side (center side of the main body container 1) and an outer filter 3B of fine mesh non-woven fabric of Tetoron.

Moreover, the filter 3 is formed in a flat shape in order to facilitate peeling of a powder layer adhering to its surface.

In addition, filter 3 is divided into a plurality of zones by wall 1a and partition rings 1b of the main body container 1. In this case, the respective zones are arranged in a way to keep the surface areas of the filter approximately uniform.

Figure 11:
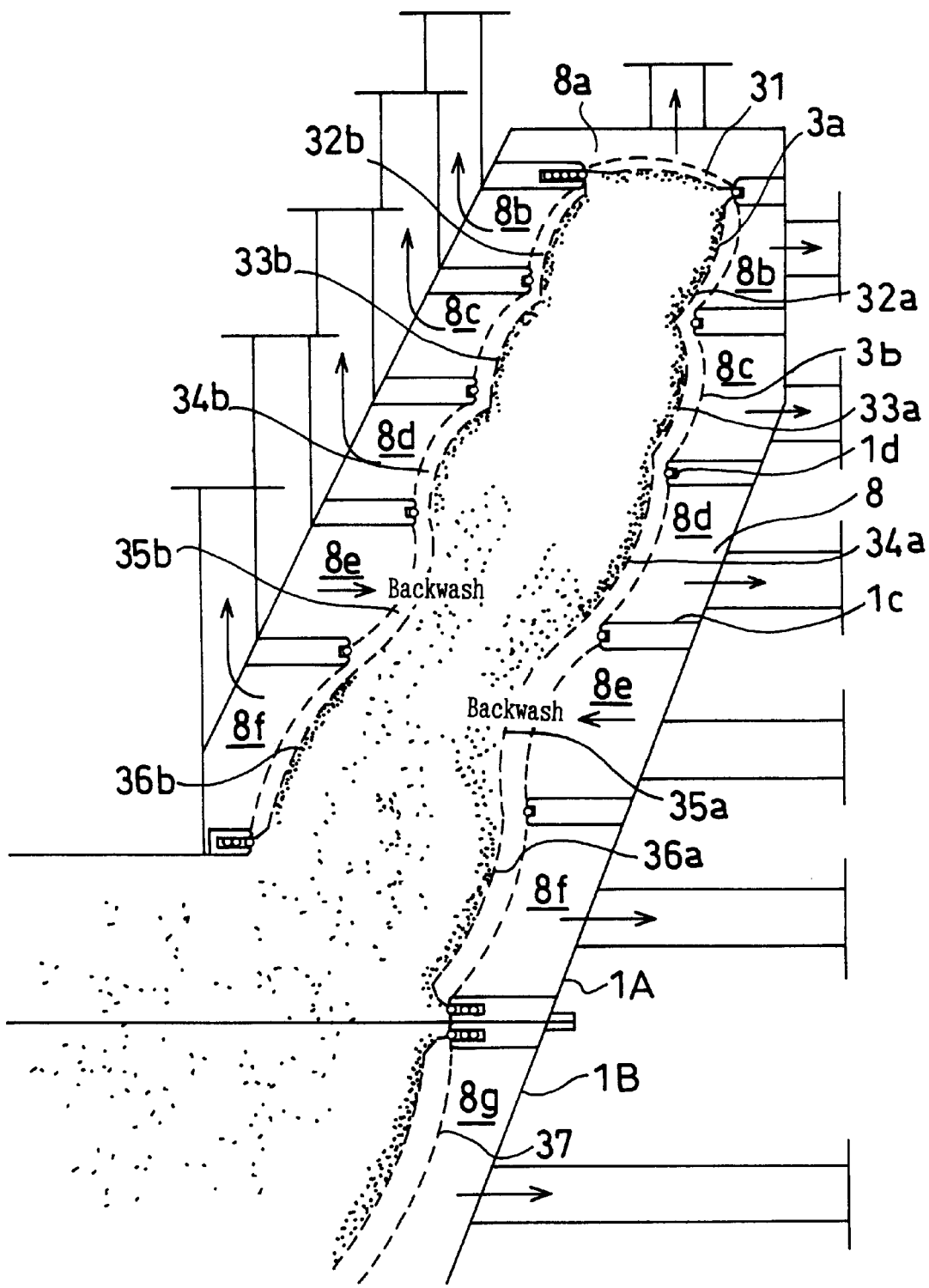
FIG. 11 is a schematic diagram showing movement of the powder during backwashing of the apparatus for granulating on a filter with the spray-dry function in FIG. 10.

In the apparatus indicated in FIG. 10 and FIG. 11, the filter 3 is divided into 8 zones, but the number of zones may be set depending on the size of the apparatus.

Also, to make it possible to independently backwash the filter divided into zones, exhaust chamber 8 is provided on the back face in each zone, and the exhaust chamber 8 in the respective zones is connected to the exhaust header 40b through exhaust valve 40a of the exhaust mechanism 4 and to the pressure tank for backwashing 50b through backwash valve 50a of the backwash mechanism 5 respectively.

The filter portion 31 is specified as zone 8a, filter portions 32a, 32b as zone 8b, filter portions 33a, 33b as zone 8c, filter portions 34a, 34b as zone 8d, ditto 35a, 35b as zone 8e, ditto 36a, 36b as zone 8f, ditto 37 as zone 8g, and the filter 38 as zone 8h. The filter portions from zone 8a to zone 8f function mainly as exhaust filters during granulation.

On the other hand, the filter in zones 8g, 8h positioned in the lower part is used for granulation on filter. For that reason, zones 8g, 8h must be backwashed more frequently than other zones.

Moreover, in the case of granulation of powder which is liable to damage the filter for example, fluidized bed granulation may be made by using a lower structure formed of stainless steel without filters in place of the lower structure 1B which include filter forming zones 8g, 8h.

Next, the state of the filter 3 during operation will be explained with reference to FIG. 11.

FIG. 11 schematically indicates the moment when the backwash valve 50a in zone 8e opens to perform a backwashing operation.

Here, the filter in zones 8a, 8b, 8c, 8d, 8f is sucked and held to the exhaust chamber 8 side by the fluidizing air flow passing from inside the main body container 1 to the exhaust header 40b through the exhaust chamber 8.

Also, the filters 35a, 35b in zone 8e instantly swell inward due to the backwashing air flowing from the pressure tank 50b for backwashing into the main body container 1 through the exhaust chamber 8. At that time, the powder layer formed on the filter 3 is peeled off of filter 3 and broken into pieces.

To explain the actions of the exhaust valves and the backwash valves in this case, backwashing is performed first by closing the exhaust valve 40a in zone 8e and momentarily opening the backwash valve 50a from the state in which all exhaust valves 40a are open and all backwash valves 50a are closed.

When this backwash valve 50a in zone 8e is opened, the outer filter 3b is drawn into close contact with all partition rings 1c and fastened by the filter presser ring 1d to prevent the backwashing air from leaking to the exhaust chamber 8 in zones 8d, 8f, while on the other hand the inner filter 3a is fastened to the partition ring 1c only at both ends of the first filters 31, 32a, 33a, 34a, 35a, 36a, second filters 32b, 33b, 34b, 35b, 36b and third filters 37, 38, because too many fastening points may cause accumulation of powder.

Next, explanation will be made on other constituent parts of the apparatus shown in FIG. 10.

This apparatus is provided, as in an ordinary fluidized bed granulating apparatus, with the product container 10, screen plate 6, bottom air supplying chamber 7 and lifting device 11.

Moreover, this apparatus is also provided with a top air supplying chamber 2, which is used for the purpose of supplying hot air when performing spray-dry by using spray-dry nozzle 9a in place of binder nozzle 9 by means of automatic nozzle replacing device 12.

The hot air flow which enters into this top air supplying chamber 2 is rectified by passing through a rectifying plate, etc. installed inside the top air supplying chamber 2, and is supplied from the central part of the upper structure 1A into the main body container 1.

Furthermore, the hot air is used for the purpose of preventing, during granulation, adhesion of powder to the central part on the top face of the main body container 1 which is not covered by the filter 3.

At this time, the hot air flows fast along the top face of the main body container 1 by being dragged into the flow of the compressed air discharged from the slits provided around the binder nozzle 9.

Next, an embodiment will be described in which light fine powder was manufactured by the spray-dry method and then granulated in succession without removing the powder from the product container, by using the apparatus for granulating on the filter with spray-dry function.

Manufacturing process of light fine powder

In the light fine powder manufacturing process, a spray-dry nozzle, of 2-fluid system capable of atomizing liquid into fine mist was used. Also, a solution for spray-dry prepared by dissolving a bulk of antimetabolite in an organic solvent was sprayed into the main body container from the spray-dry nozzle and, in parallel with it, hot air for drying was supplied from the top part of the main body container. The fine particles sprayed from the nozzle for spray-dry were put in contact with the hot air supplied from the top part of the main body container while running together with it, dried and turned into light fine powder. That light fine powder rode on the fluidizing air flow, was separated from the air flow by the filter disposed on the face of the main body container, and only the light fine powder was caught on the filter.

The light fine powder caught on the filter, the particle size of which is as small as several Am, drops in the form of flocculated lumps composed of thousands of primary particles when it is peeled from the filter. The lumps are collected in the product container at the bottom of the main body container. In this way, light fine powder composed of flocculated lumps of noncrystalline antimetabolite, the particle size of primary particles of which is several $\mu$m (hereinafter referred to as "flocculated powder"), was obtained.

As the conditions of spray-dry, the volume of hot air used for the drying was set for 40 m³/min, the supply air temperature at 65° C., the flow rate of spray-dry solution at 3.2 kg/min, the atomizing air pressure for pulverizing that solution at 5.0 kgf/cm², and the flow rate at 4.0 Nm³/min.

As the backwash conditions, the backwash will be set in a way to be performed sequentially from top to bottom. In that case, the backwash interval is set for 15 seconds, the backwash time per point for 1 second and the backwash air pressure at 5 kgf/cm²·

Particle size distribution, mean particle diameter, bulk density and weight of the noncrystalline antimetabolite with a particle size of several μm obtained by the method described above are shown in Table 1.

TABLE 1

| Particle size distribution | | | | | | | | | | | |
|---|---|---|---|---|---|---|---|---|---|---|---|
| Particle diameter [μm] | 17.75 | 12.55 | 8.87 | 6.27 | 4.43 | 3.13 | 2.21 | 1.30 | 0.80 | 0.55 | 0.39 |
| wt % | 0 | 3.6 | 11.8 | 18.9 | 19.3 | 14.5 | 12.1 | 9.7 | 6.1 | 4.0 | 0 |

| | |
|---|---|
| Mean particle diameter | 4.39 [μm] |
| Bulk density | 0.243 [g/cc] |
| Weight | 60 [kg] |

Granulation process of flocculated powder

To granulate the flocculated powder, the spray-dry nozzle which was provided at the top of the main body was replaced with a binder nozzle.

Also, fluidizing air was fed from the bottom air supplying chamber to the flocculated powder collected in the product container, to blow up and fluidize the flocculated powder. The result is that the flocculated powder is somewhat pulverized with the mixing action made by utilizing the filter to change into flocculated powder of smaller size.

Also, to prevent, the small flocculated powder from becoming flocculated powder of a larger size again, 900 g of light silicic acid anhydride was added as flocculation inhibitor, and was mixed sufficiently well until fluidity appears in the powder. After that, vehicles (lactose 40 kg, microcrystalline cellulose 13.5 kg) were injected by sucking into this fluidized flocculated powder by utilizing the presence of negative pressure inside the main body container.

When the injected vehicles and the flocculated powder were blended sufficiently well, a small amount of binder was sprayed from the binder nozzle for the purpose of deflocculation.

After that, the feed volume of the binder was increased to perform initial granulation (the granulation on filter), and the feed volume of the mist advancing air from the binder nozzle was increased when the granules which grew with granulation on the filter came to form a fluidized bed so that the binder mist may reach the fluidized bed.

The granulation process to progressed in this way and, when the particle size of the granules became the target size, the feed of the binder was stopped for drying, and granulated products were obtained.

As the conditions of granulation, the volume of hot air used for fluidizing the mixed powder was set for 80 m³/min, the supply air temperature at 609 C, and the supply air humidity at 7 g/kg. As the binder, 3% aqueous solution of hydroxy propylmethyl cellulose was used, and its flow rate was set for 560 g/min in the deflocculation process and 1050 g/min in the initial granulation (the granulation on the filter), intermediate granulation (a combination of the granulation on the filter and fluidized bed granulation) and regular granulation (fluidized bed granulation) processes, while the atomizing air flow rate was set for 1500 NL/min.

In addition, the volume to feed the mist advancing air from the binder nozzle was set for 300 NL/min during the deflocculation process and the initial granulation process but for 800 NL/min in the intermediate granulation process and the and regular granulation process.

The conditions of drying were the same as those of granulation as far as the supply air volume, supply air temperature and supply air humidity were concerned.

As for the backwash conditions, in order to backwash the filter 37,38, in the bottom stages, where granulation on the filter is made actively, more frequently than others, the backwash is performed by the following sequence.

Namely, the backwash is made in the order of filter 31→37→32*a*, 32*b*→38→33*a*, 33*b*→37→34*a*, 34*b*→38→35*a*, 35*b*→37→36*a*, 36*b*→38, with backwash interval of 15 seconds, backwash time per point of 1 second and backwash air pressure of 5 kgf/cm²·

The particle size distribution, content, yield, dissolution rate and water content in granule of the granulated products obtained as a result of this operation were as shown on Table 2

TABLE 2

| Particle size distribution | | | | | | | |
|---|---|---|---|---|---|---|---|
| Mesh | 30M | 42M | 60M | 83M | 140M | 200M | PASS |
| wt % | 3.7 | 16.7 | 25.9 | 25.9 | 22.2 | 3.7 | 1.9 |
| Content [%] | | | 100.32 | 101.56 | 98.68 | 101.74 | 99.88 |
| (sampled at 20 points) | | | 101.50 | 99.67 | 99.74 | 100.04 | 100.49 |
| | | | 100.25 | 101.62 | 100.61 | 98.78 | 99.83 |
| | | | 100.38 | 99.56 | 100.48 | 99.72 | 101.63 |

| | |
|---|---|
| Mean content | 100.324[%] |
| Standard deviation | 0.911 |
| Process capability index | 2.56 |
| (Case of 93–107% content standard) | |
| Yield | 98.5[%] |
| Dissolution rate | 94.3[%] |
| Water content in granule (before drying) | 3.17[%] |
| Water content in granule (after drying) | 1.93[%] |

REFERENCE EXAMPLE

Granulation was made under the conditions given below by using a conventional fluidized bed granulation apparatus with the same raw material (noncrystalline antimetabolite of a particle size of 4.01 μm 12 kg, lactose 8.0 kg, microcrystalline cellulose 2.7 kg) and the same binder as those of the embodiment, and comparison was made with the granulated products made by the embodiment on particle size distribution, content, yield, dissolution rate and water content in granule. The raw material had been mixed in advance by using a high-speed mixer.

As the conditions of granulation and drying, the supply air temperature was set at 60° C., and the supply air humidity at 7 g/kg, and the volume of hot air was set for 5 m³/min during the period of 30 minutes from the start of granulation and for 15 m'/min thereafter up to the end of granulation and during the drying. The flow rate of the binder was set for 200 g/min during the period from the start to the end of granulation.

Table 3 indicates the comparative data.

dropped to 86.4% because of a lot of loss due to adhesion. In addition, there was a large deviation of content because a lot of flocculated lumps drop in non granulated state from the filter at the time of collection of granulated products after the granulation, and this cannot be considered as uniform content judging from the process capability index.

TABLE 3

| | Particle size distribution [wt %] | | | | | | |
|---|---|---|---|---|---|---|---|
| Mesh | 30M | 42M | 60M | 83M | 140M | 200M | Pass |
| Embodiment: Granulation on the filter + Fluidized bed granulation | 3.7 | 16.7 | 25.9 | 25.9 | 22.2 | 3.7 | 1.9 |
| Reference example: Fluidized bed granulation | 20.8 | 23.3 | 16.9 | 11.7 | 9.6 | 8.2 | 9.5 |

| | Mean content | Standard deviation | Process capability index | Yield [%] | Dissolution rate [%] | Water content in granulate [%] | |
|---|---|---|---|---|---|---|---|
| | | | | | | Before drying | After drying |
| Embodiment: Granulation on the filter + Fluidized bed granulation | 100.324 | 0.911 | 2.56 | 98.5 | 94.3 | 3.17 | 1.93 |
| Reference example: Fluidized bed granulation | 94.12 | 2.54 | 0.92 | 86.4 | 80.2 | 13.5 | 2.2 |

Observations will be made hereafter on the comparative data indicated in Table 3.

In the embodiment, granulation on the filter was made in the lower part of the main body container and fluidized bed granulation was performed in the product container. As a result, granulated products of uniform particle size were obtained because powder of small particle size is granulated preferentially and that of larger size is pulverized in the dry zone by the granulation on the filter.

On the other hand, the conventional fluidized bed granulation method of the reference example consists in first spraying binder in a volume approximately 3 times the hot air drying capacity and performing granulation in a state of high water content by increasing the water content of the light fine powder in a short time. For that reason, coarse particles of a diameter of I to 10 mm were produced in a large quantity. Moreover, the light fine powder, which flied up and adhered to the filter and the inner circumferential face of the main body container in the early period of granulation, dropped in non granulated state after the end of granulation at the time of collection of granulated products, without falling during the granulation. For that reason, these granulated products came to contain a lot of coarse granules of 30-mesh or over and fine powder of particle size of 200-mesh or under.

Furthermore, by the granulation on the filter method of the embodiment, there was no adhesion of light fine powder to the inner face of the apparatus and the yield improved, because the mixed powder which flied up with fluidizing air flow in the early period of granulation is forcibly caught on the filter. And, the light fine powder which was classified with the fluidizing air flow was also mixed completely with the progress of granulation, and the mean content was almost 100%.

On the other hand, by the conventional fluidized bed granulation method of the reference example, the mean content dropped because much of the powder which adhered to the inner face of the apparatus consisted of highly adhesive bulk of antimetabolite, in spite of the fact that the raw material had been mixed in advance. And, the yield also On the contrary, by the granulation on the filter method of the embodiment, there was little deviation of content and the process capability index indicated values of 1.33 or over, and this may well be considered as uniform content.

In addition, the granulated products of the embodiment, which underwent a deflocculation process, indicated a better dissolution rate in the stabilizing test compared with the granulated products of the reference example which did not undergo any deflocculation.

Next, to compare the quality of the granulated products obtained by the embodiment and the reference example, those granulated products were processed into tablets by using one same apparatus (tablet machine) and under one same condition (tablet making pressure 1200 kg) and the hardness and the dissolution rate of the tablets obtained were measured. Table 4 indicates the results of measurements. The hardness value given here is the mean value of the measured values of 10 tablets picked up at random.

TABLE 4

| Hardness and dissolution rate of tablets | | |
|---|---|---|
| | Hardness [kp] | Dissolution [%] |
| Embodiment (with deflocculation process) | 12.1 | 94.6 |
| Reference example (without deflocculation process) | 8.4 | 73.3 |

Observations will be made hereafter of the comparative data given in Table 4.

The higher the hardness of tablets, the better the tablets, because they are less liable to be destroyed or worn in the distribution process or during the use. Moreover, the higher the dissolution rate, the better, because the tablets must fully dissolve in the prescribed time. However, the general trend is that as the hardness is increased the dissolution rate gradually drops.

Nevertheless, the tablets of the embodiment presented higher hardness and higher dissolution rate compared with those of the reference example in spite of the fact that both of them were produced under one same condition. Namely, the dissolution rate of the tablets of the embodiment did not drop in spite of an increased hardness.

This comes from the difference of granulated products. The granulated products of the embodiment were coated with a binder on all primary particles in the deflocculation process. For that reason, the binder on the surface of the primary particles played the roll of an adhesive and bonded all primary particles at the time of tablet making, and this resulted in high hardness of tablets. Moreover, the dissolution rate of these tablets did not drop because the binder on the surface of the primary particles is easily melted and dispersed to the individual primary particles. On the contrary, the granulated products of the reference example are not coated with the binder on the primary particles inside the flocculated lump, because they were granulated by just spraying a large flow rate of binder, without making any deflocculation, to coat the binder in a way to cover the surface of the flocculated lumps and bind those flocculated lumps to one another. For that reason, the tablets made of those granulated products became fragile at the inside of the flocculated lumps where there is no binder and their hardness dropped. Furthermore, since those tablets were submitted to mechanical pressure, at the time of tablet making, in the state without binder on the surface of the primary particles inside the flocculated lumps, the primary particles inside the flocculated lumps were fixed without being dispersed to the individual primary particles at the time of dissolution, leading to a low dissolution rate.

What is claimed is:

1. A powder granulating apparatus comprising:

a closable main body container including a top portion and a main body portion having an inner peripheral surface, wherein said top portion has a central part that projects into said main body portion;

a spray nozzle disposed at a center of said central part;

a first filter for forming a high-density powder layer, said first filter being disposed along the inner peripheral surface of said main body portion such that a first space is formed between said first filter and said inner peripheral surface of said main body portion;

a second filter for forming a high-density powder layer, said second filter being disposed around said central part of said top portion such that a second space is formed between said second filter and said central part;

a backwash mechanism in communication with said first and second spaces for selectively backwashing said first and second filters; and an exhaust mechanism in communication with said first and second spaces for selectively exhausting air therefrom.

2. A powder granulating apparatus as claimed in claim 1, wherein said first space is divided into a plurality of zones, and backwashing of said first filter can be performed in one of said zones while sucking and holding said first filter by exhausting air through said first filter in the other of said zones.

3. A powder granulating apparatus as claimed in claim 1, wherein said first space is horizontally divided into a plurality of ring-shaped zones, and backwashing of said first filter can be performed in one of said ring-shaped zones while sucking and holding said first filter by exhausting air through said first filter in the other of said ring-shaped zones.

4. A powder granulating apparatus as claimed in claim 1, further comprising a plurality of partition rings disposed in said first space such that said first space is divided into a plurality of ring-shaped zones, and wherein backwashing of said first filter is performed in one of said ring-shaped zones while sucking and holding said first filter by exhausting air through said first filter in the other of ring-shaped said zones.

5. A powder granulating apparatus as claimed in claim 1, further comprising a top air supply chamber mounted at said top portion of said main body container.

6. A powder granulating apparatus as claimed in claim 5, further comprising a bottom air supply chamber mounted at a bottom portion of said main body container.

7. A powder granulating apparatus comprising:

a closable main body container including a top portion and a main body portion having an inner peripheral surface;

a filter for forming a high-density powder layer, said filter being disposed along the inner peripheral surface of said main body portion such that a space is formed between said filter and said inner peripheral surface of said main body portion, wherein said space is horizontally divided into a plurality of ring-shaped zones;

a backwash mechanism in communication with said ring-shaped zones for selectively backwashing said filter; and an exhaust mechanism in communication with said ring-shaped zones for selectively exhausting air therefrom, wherein one of said ring-shaped zones can be backwashed while sucking and holding said filter by exhausting air from the other of said ring-shaped zones.

8. A powder granulating apparatus as claimed in claim 7, wherein said ring-shaped zones are formed by a plurality of partition rings which extend between said inner peripheral surface of said main body portion and said filter.

9. A powder granulating apparatus as claimed in claim 7, further comprising a spray nozzle disposed at a center of said top portion.

10. A powder granulating apparatus as claimed in claim 7, further comprising a top air supply chamber mounted at said top portion of said main body container.

11. A powder granulating apparatus as claimed in claim 10, further comprising a bottom air supply chamber mounted at a bottom portion of said main body portion.

* * * * *